United States Patent [19]
Hattori et al.

[11] 4,072,137
[45] Feb. 7, 1978

[54] AIR-TO-FUEL RATIO ADJUSTING SYSTEM FOR AN INTERNAL COMBUSTION ENGINE

[75] Inventors: Tadashi Hattori, Okazaki; Akira Takada, Toyota; Takamichi Nakase, Gamagori; Fumio Sugi, Okazaki, all of Japan

[73] Assignees: Nippon Soken, Inc., Nishio; Toyota Jidosha Kogyo Kabushiki Kaisha, Toyota, both of Japan

[21] Appl. No.: 679,495

[22] Filed: Apr. 22, 1976

[30] Foreign Application Priority Data

May 6, 1975 Japan .................. 50-53989

[51] Int. Cl.² ............... F02M 33/00; F02M 7/00
[52] U.S. Cl. ............... 123/119 DB; 123/119 EC; 60/276; 60/285
[58] Field of Search ........ 123/124 A, 119 EC, 119 D, 123/119 DB, 32 EE; 60/276, 285

[56] References Cited

U.S. PATENT DOCUMENTS

| | | | |
|---|---|---|---|
| 3,030,027 | 4/1962 | Reppert | 123/124 A |
| 3,759,232 | 9/1973 | Wahl | 123/32 EA |
| 3,827,237 | 8/1974 | Linder | 123/32 EA |
| 3,964,457 | 6/1976 | Coscia | 123/119 DB |

*Primary Examiner*—Ronald B. Cox
*Attorney, Agent, or Firm*—Cushman, Darby & Cushman

[57] ABSTRACT

In an air-to-fuel ratio adjusting system for an internal combustion engine which comprises an additional air supply passage communicating with the carburetor of an internal combustion engine at the position downstream of its throttle valve, a control valve disposed in the additional air supply passage to vary the passage area thereof, and a percolation sensor for detecting percolation phenomenon of the fuel during idling operation of the engine is provided. When the occurrence of a percolation phenomenon is determined in accordance with the output signal of the percolation sensor, the control valve is controlled in response to the output signal of an air-to-fuel ratio sensor, whereas the control valve is held in a predetermined valve position when there is no occurrence of percolation phenomenon during idling operation of the engine.

10 Claims, 6 Drawing Figures

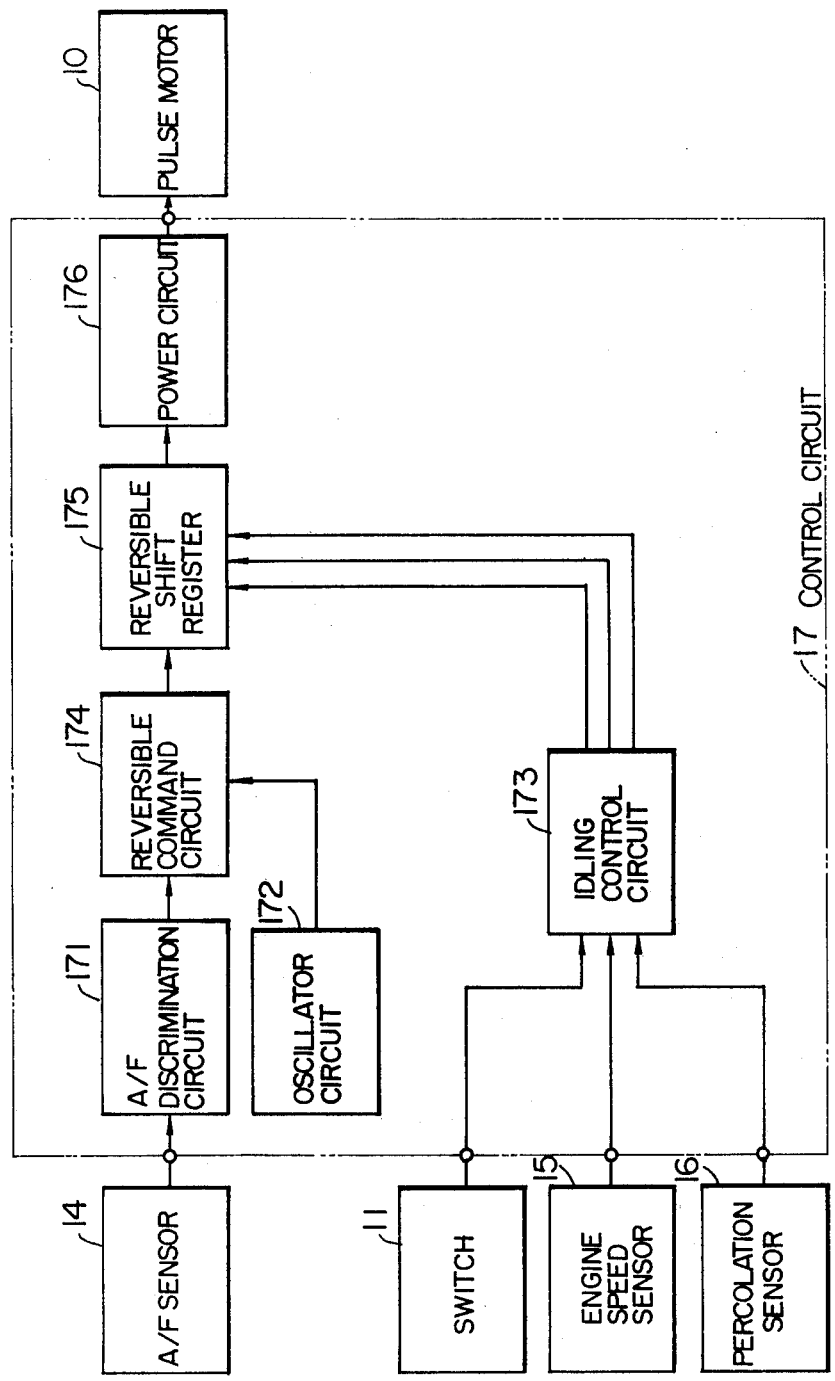

AIR-TO-FUEL RATIO ADJUSTING SYSTEM FOR AN INTERNAL COMBUSTION ENGINE

The present invention relates to an air-to-fuel ratio adjusting system capable of properly controlling and air-to-fuel ratio of a mixture fed to an internal combustion engine at all times.

When it is desired to ensure the maximum efficiency of the modified engines proposed for automobile exhaust emission control purposes or when it is desired to ensure for the engines equipped with exhaust gas clearing catalysts the optimum cleaning up of the exhaust gases by their catalysts, it is necessary to use an air-to-fuel ratio adjusting system to always properly control the air-to-fuel ratio of the mixture fed to the engine. An air-to-fuel adjusting system of this type has been proposed in which the air-to-fuel ratio of the mixture is adjusted by means of an air-to-fuel ratio sensor for detecting the air-to-fuel ratio of the mixture from the concentration of oxygen in the exhaust gases and an additional-air control valve responsive to the output signal of this air-to-fuel ratio sensor to control the amount of additional air. A disadvantage of this conventional system is that due to a poor response characteristic of the air-to-fuel ratio sensor, controlling the additional-air control valve in response to the output signal of the air-to-fuel ratio sensor during idling operation of the engine results in unstable operation of the engine. The inventors have proposed an improved system in which the additional-air control valve is controlled so that during the idle periods of engine operation the additional-air control valve is always held in a predetermined position (the fully closed position) independently of the output signal of the air-to-fuel ratio sensor, thus ensuring the optimum air-to-fuel ratio of the mixture for stable operation of the engine and exhaust emission control purposes. This system is also disadvantageous in that when the engine is left to idle after the vehicle has run at high speed, has ascended a long sloping road or has run for a long period of time at low speed, the temperature in the engine room rises abnormally with the resulting percolation phenomenon of the fuel and formation of an extremely rich mixture and consequently not only the exhaust cleaning catalytic converter disposed in the exhaust system is effected adversely, but also the engine is caused to function improperly giving rise to the stopping of the engine or making the restarting of the engine very difficult.

With a view of overcoming the foregoing difficulty, it is an object of this invention to provide an improved air-to-fuel ratio adjusting system wherein when percolation of the fuel occurs during idling operation of the engine, an additional-air control valve for compensating the air quantity is controlled to adjust the air-to-fuel ratio of the mixture and thereby adjust any large variation of the air-to-fuel ratio of the mixture due to the percolation, whereas when there is no occurrence of percolation the additional-air control valve is held in a predetermined position to ensure stable operation of the engine.

The system of this invention has among its great advantages the fact that not only stable operation of the engine during the idle periods of engine operation is ensured, but also such problems as deterioration of the catalytic converter, malfunctioning of the engine and difficulty in restarting the engine in the event of percolation of the fuel are eliminated and moreover the idle compensator of the carburetor which is conventionally used as an anti-percolation device is eliminated.

Other features and advantages of the invention will be apparent from the following detailed description taken in conjunction with the accompanying drawings, in which:

FIG. 3 is a block diagram of the control circuit used in the embodiment of FIG. 1.

Figure 1:
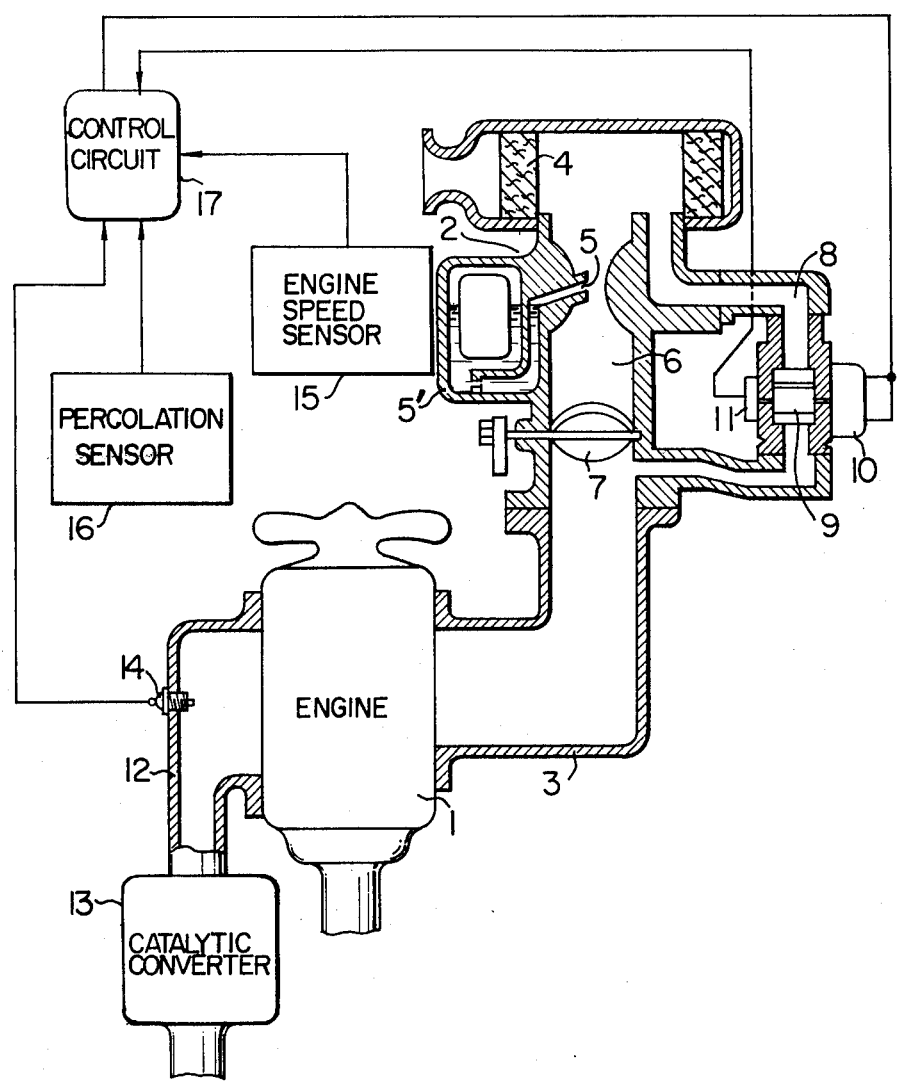
FIG. 1 is a schematic diagram showing an embodiment of an air-to-fuel ratio adjusting system according to the invention.

The present invention will now be described in greater detail with reference to the illustrated embodiment. FIG. 1 is a schematic diagram of an air-to-fuel ratio adjusting system according to the invention.

In the Figure, numeral 1 designates a reciprocating-type internal combustion engine. Of course, any other type of internal combustion engine may be used. The engine 1 is fed with an air-fuel mixture from a carburetor 2 through an intake manifold 3. In the carburetor 2, air cleaned through an air filter 4 is mixed with fuel supplied from a fuel tank (not shown) and is then atomized producing a mixture, and the carburetor 2 includes a fuel nozzle 5, a float chamber 5', a throttle valve 7 linked to the accelerator pedal (not shown) and disposed in a main passage 6 to control the amount of air-fuel mixture, etc. The carburetor 2 differs somewhat from the ordinary carburetors in that a bypass passage 8 is provided between the air filter 4 and the portion of the main passage 6 downstream of the throttle valve 7 to bypass the fuel nozzle 5 and the throttle valve 7.

A control valve 9 is disposed in the bypass passage 8 to vary the passage area and thereby control the amount of air passing therethrough. The control valve 9 is a square, rotatable butterfly valve and one end of its shaft is connected to a pulse motor 10 for operating the control valve 9. The other end of the shaft of the control valve 9 is connected to a switch 11 for detecting the fully closed position of the control valve 9, so that the switch 11 generates a control valve closure signal when the control valve 9 is placed in the fully closed position.

The carburetor 2 is adjusted to produce an air-fuel mixture which is on the slightly rich side as compared with that required by the engine 1 and the bypass passage 8 is controlled so that the passage area of the bypass passage 8 is varied to supply a needed air as an additional air and the air-fuel mixture eventually fed to the engine 1 has the required air-to-fuel ratio.

An exhaust manifold 12 for discharging the exhaust gases from the engine 1 is provided in the exhaust system of the engine 1 and a catalytic converter 13 for cleaning up the exhaust gases is provided downstream of the exhaust manifold 12. While the catalytic converter 13 should preferably be of a three-component catalytic converter capable of reducing $NO_x$, CO and HC, any other type of catalytic converter may be used. The catalytic converter 13 may be replaced with a thermal reactor as the case may be.

Mounted on the exhaust manifold 12 is an air-to-fuel ratio sensor 14 comprising a known type of oxygen sensor employing zirconium dioxide. Of course, the air-to-fuel ratio sensor 14 may employ any other metal oxide such as titanium dioxide.

Figure 2:
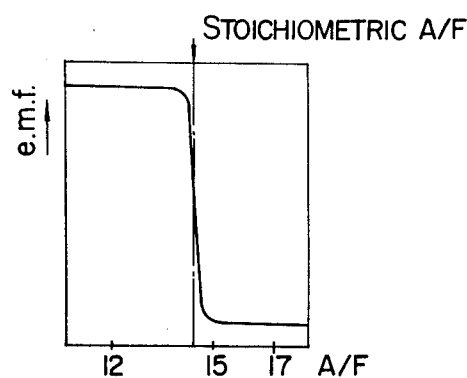
FIG. 2 is a graph showing the output signal of the air-to-fuel ratio sensor used in the embodiment of FIG. 1.

The air-to-fuel ratio sensor 14 is of the type whose electromotive force varies in accordance with the concentration of oxygen in the exhaust gases and the electromotive force changes in a step fashion with the air-to-fuel ratio of mixture with the stoichiometric air-to-fuel ratio as the threshold value as shown in FIG. 2.

In FIG. 1, numeral 15 designates an engine speed sensor for detecting the rotational speed of the engine 1 to generate an electric signal, which may be composed of the contact points of the breaker disposed in the known type of distributor (not shown) which is linked to the crankshaft of the engine 1. Of course, this is exemplary only and any other type of sensor may be used.

A percolation sensor 16 detects percolation phenomenon of the fuel which is to be supplied to the engine 1 and generates an electric signal, and it may be comprised for example of a cooling water temperature sensor of the bimetal type, thermoferrite type or thermowax type which detects the temperature of the cooling water of the engine 1 to indirectly detect the occurrence of percolation phenomenon. In this case, the temperature setting of the sensor should be between 90 and 100° C or about 100° C in terms of the cooling water temperature so that an output signal is generated when the detected temperature exceeds the preset temperature. The percolation sensor 16 is not limited to such cooling water temperature sensors and it may be of any other type which is capable of detecting the occurrence of percolation phenomenon such as one which detects the temperature of the fuel in the float chamber 5'.

A control circuit 17 controls the operation and stopping of the pulse motor 10 in response to the signals from the air-to-fuel ratio sensor 14, the engine speed sensor 15 and the percolation sensor 16 to thereby vary the position of the control valve 9, and more specifically the control circuit 17 responds principally to the output signal of the air-to-fuel ratio sensor 14 to operate the control valve 9 and thereby control the amount of additional air supplied through the bypass passage 8, thus accomplishing the feedback control on the air-to-fuel ratio of mixture.

FIG. 3 is a block diagram of the control circuit 17. The control circuit 17 receives as its input signals the air-to-fuel ratio signal from the air-to-fuel ratio sensor 14, the engine speed signal from the engine speed sensor 15 for detecting the rotational speed of the engine and the control valve closure signal from the switch 11 and it comprises an A/F discrimination circuit 171, an oscillator circuit 172, an idling control circuit 173, a reversible command circuit 174, a reversible shift register 175 and a power circuit 176 to control the operation of the pulse motor 10 which is used as a driving motor.

With the construction described above, the air-fuel mixture produced in the carburetor 2 and slightly on the rich side is diluted with the additional air from the bypass passage 8 in the portion downstream of the throttle valve 7 and in this way the mixture with the air-to-fuel ratio required by the engine 1 is fed into the combustion chambers of the engine 1 which are not shown.

In the engine 1, the exhaust gases produced by the burning of the mixture are discharged to the atmosphere through the exhaust manifold 12, the catalytic converter 13 and the muffler which is not shown. When the engine rotational speed is higher than the idle speed, namely, under operating conditions of the engine other than the idling operation, the air-to-fuel ratio of the mixture supplied from the carburetor 2 is detected by the air-to-fuel ratio sensor 14 and its output signal is applied to the A/F discrimination circuit 171 of the control circuit 17 which determines whether the detached air-to-fuel ratio is less than or greater than the preset air-to-fuel ratio (the stoichiometric air-to-fuel ratio) which is to be controlled, whereby when the detected value is less than the preset value the pulse motor 10 is rotated in a direction which opens the control valve 9 mounted in the bypass passage 8, whereas when the detected value is greater than the preset value the pulse motor 10 is rotated in another direction which closes the control valve 9, thereby controlling the control valve 9 to correct the air-to-fuel ratio of the mixture with the additional air to become equal to the preset air-to-fuel ratio. On the other hand, at the idling speed when the engine 1 is idling, if the percolation sensor or engine cooling water temperature sensor 16 detects the occurrence of percolation phenomenon, that is, when the cooling water temperature is higher than a predetermined value, in a similar manner as the previously mentioned case under the engine operating conditions excepting the idling operation, the control valve 9 is operated in response to the output signal of the air-to-fuel ratio sensor 14 to maintain the air-to-fuel ratio of the mixture at the stoichiometric one and thereby prevent the occurrence of any engine irregularity due to excessive enriching of the mixture. When there is no occurrence of percolation phenomenon during the idle periods of engine operation, the control valve 9 is held in a predetermined closed position (fully closed position) thus ensuring stable idling operation of the engine 1. Of course, the predetermined position of the control valve 9 is not limited to the fully closed position and any other appropriate valve position may be used.

Figure 4:
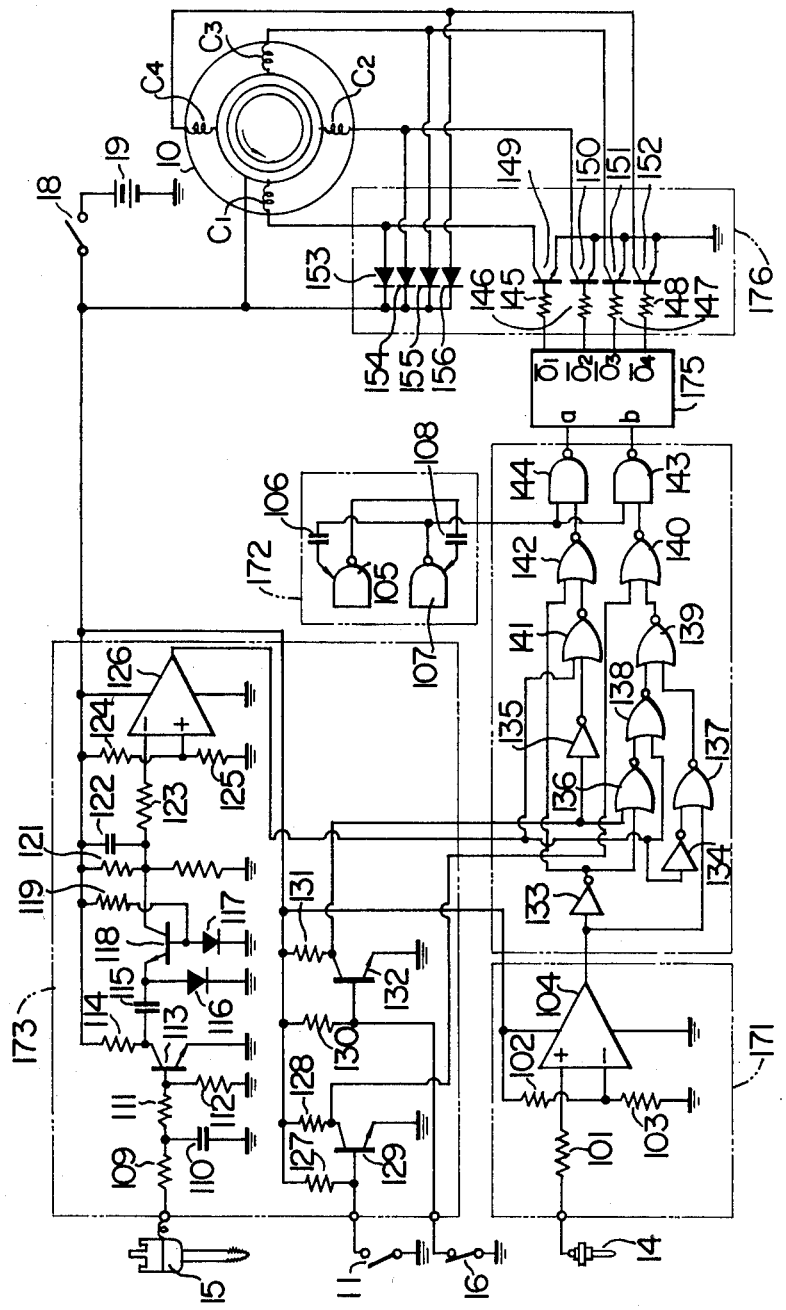
FIG. 4 is a wiring diagram of the control circuit shown in FIG. 3.

The operation of the embodiment will now be described in greater detail with reference to the wiring diagram of the control circuit 17 shown in FIG. 4. It should be noted here that all of the individual circuits in the control circuit 17 and the pulse motor 10 are energized by a DC power source 19 such as a battery through an engine key switch 18. The output signal of the air-to-fuel ratio sensor 14 is applied to the input of the discrimination circuit 171 comprising mainly resistors 101, 102 and 103 and a differential operational amplifier 104, so that it is compared with the voltage preset by the resistors 102 and 103 (i.e., one which is equal to the electromotive force of the air-to-fuel ratio sensor 14 substantially at the stoichiometric air-to-fuel ratio) and is then discriminated in such a manner that when the applied signal is higher than the preset voltage, namely, when the detached air-to-fuel ratio is smaller than the stoichiometric one the output goes to a "1" level, whereas when the applied signal is lower than the preset voltage, namely, when the detected air-to-fuel ratio is greater than the stoichiometric one the output goes to a "0" level. The oscillator circuit 172 is a circuit which generates control pulse signals for driving the pulse motor 10 and an astable multivibrator is formed by NAND gates 105 and 107 with expander terminals and capacitors 106 and 108 with the pulse frequency being set to ensure the optimum control. The idling control circuit 173 comprises a percolation detecting circuit consisting of resistors 130 and 131 and a transistor 132, a fully closed position detecting circuit consisting of resistors 127 and 128 and a transistor 129 and an engine speed detecting circuit consisting of elements 109 through 126. This engine speed detecting circuit is a known circuit which receives as its input signal the output signal of the engine speed sensor 15 (the voltage from the primary winding of the ignition coil, the negative terminal of the ignition coil or the point terminal of the distributor) and it comprises a waveform shaping circuit consisting of resistors 109, 111, 112 and 114, a capacitor 110 and a transistor 113, a D-A converter circuit consisting of capacitors 115 and 122, diodes 116 and 117, a transistor 118 and resistors 119, 120 and 121 and a comparison circuit consisting of resistors 123, 124 and 125 and a differential operational amplifier 126. The detection speed of this engine speed detecting circuit is preset so that when the engine rotational speed is higher than the preset rotational speed (the idle speed) the output of the operational amplifier 126 goes to the "1" level, whereas the output goes to the "0" level when the engine rotational speed is lower than the preset rotational speed, that is, the output of the operational amplifier 126 goes to the "0" level at the engine rotational speeds under idling operating condition. The fully closed position detecting circuit is designed so that when the control valve 9 is placed in the fully closed position, the contacts of the switch 11 are closed and the output (i.e., the output at the collector of the transistor 129) goes to the "1" level. The percolation detecting circuit is designed so that when the cooling water temperature becomes higher than 90° C, for example, so that the percolation sensor or engine cooling water temperature sensor 16 determines that percolation phenomenon has occurred and opens its contacts, the output (i.e., the output at the collector of the transistor 132) goes to the "0" level.

The output signals of these A/F discrimination circuit 171, the oscillator circuit 172 and the idling control circuit 173 are applied to the reversible command circuit 174 which in turn generates the required forward, reverse and stop signals for the pulse motor 10.

Figures 5A, 5B:
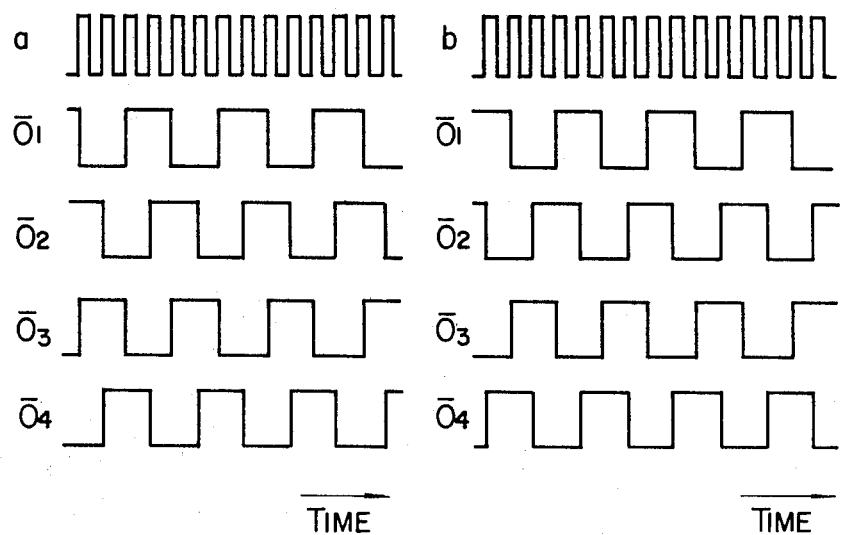
FIGS. 5A and 5B are waveform diagrams useful in explaining the operation of the reversible shift register shown in FIG. 4.

The reversible command circuit 174 provides the required logics for controlling the direction of rotation and stoppage of the pulse motor 10 by means of NOT gates 133, 134 and 135, NOR gates 136, 137, 138, 139, 140, 141 and 142 and NAND gates 143 and 144. When the engine rotational speed is higher than the preset rotational speed (i.e., at the engine rotational speeds excluding the idle speed) or when the engine rotational speed is lower than the preset rotational speed (i.e., at the idling operation) and the engine cooling water temperature is higher than 90° C in which it is experimentally suggested that percolation phenomenon is likely to occur, if the air-fuel mixture is on the rich side, the NAND gate 144 is opened passing the pulse signals from the oscillator circuit 172 to an input terminal $a$ of the reversible shift register 175, whereas if the mixture is on the lean side, the NAND gate 143 is opened passing the same pulse signals to an input terminal $b$ of the reversible shift register 175. On the other hand, when the engine rotational speed is lower than the preset speed (i.e., at the idling operation) and the engine cooling water temperature is lower than 90° C (i.e., when the occurrence of percolation is unlikely), the NAND gate 143 is held open until the control valve 9 is moved into its fully closed position and at the instant that the switch 11 detects that the control valve 9 has been placed in the fully closed position both of the NAND gates 143 and 144 are closed thus no longer passing the pulse signals to either of the input terminals $a$ and $b$ of the reversible shift register 175 and thereby holding the control valve 9 in the fully closed position. When the pulse signals from the oscillator circuit 172 are entered at the terminal $a$ of the reversible shift register 175, its output terminals $\bar{0}_1, \bar{0}_2, \bar{0}_3$ and $\bar{0}_4$ are sequentially shifted as shown in FIG. 5A. On the other hand, when the pulse signals are entered at the terminal $b$, the outputs $\bar{0}_4, \bar{0}_3, \bar{0}_2$ and $\bar{0}_1$ are sequentially shifted as shown in FIG. 5B. The output terminals $\bar{0}_1, \bar{0}_2, \bar{0}_3$ and $\bar{0}_4$ are connected to the power circuit 176 comprising resistors 145, 146, 147 and 148, power transistors 149, 150, 151 and 152 and counter electromotive force absorbing diodes 153, 154, 155 and 156, and the power circuit 176 is connected to field coils $C_1, C_2, C_3$ and $C_4$ of the pulse motor 10. When the pulse signals are entered at the input terminal $a$ of the reversible shift register 175, the transistors 149, 150, 151 and 152 are sequentially turned on and the field coils $C_1, C_2, C_3$ and $C_4$ of the pulse motor 10 are similarly energized two phases at a time thus rotating the rotor of the pulse motor 10 in the direction of the arrow shown in FIG. 4 and thereby rotating the control valve 9 in a direction which opens it. On the other hand, when the pulse signals are entered at the terminal $b$, the reverse action occurs so that the rotor of the pulse motor 10 is rotated in a direction which is opposite to the direction of the arrow and the control valve 9 is rotated in another direction which closes it.

It will thus be seen from the foregoing that in accordance with the present invention, when percolation of the fuel occurs during idle operation of the engine, the properly controlled amount of air by the control valve is additionally supplied through the bypass passage to provide compensation and thereby prevent the mixture from becoming extremely rich. In that way such problems as deterioration of catalysts, engine malfunctions and difficulty in restarting can be eliminated. On the other hand, when there is no occurrence of percolation during the idle periods of engine operation, the control valve is temporarily held in its fully closed position thus ensuring stable idling operation of the engine.

What we claim is:

1. An air-to-fuel ratio adjusting system for an internal combustion engine comprising:

a. a carburetor connected to an intake pipe of an internal combustion engine for supplying an air-fuel mixture to said engine, said carburetor including a main passage for passing said air-fuel mixture therethrough and a throttle valve disposed in said main passage to control the amount of said air-fuel mixture;

b. a bypass passage for introducing additional air into said main passage;

c. a control valve disposed in said bypass passage for varying the amount of additional air therethrough to compensate the air-to-fuel ratio of said air-fuel mixture;

d. a driving motor connected to said control valve to operate said control valve;

e. air-to-fuel ratio sensing means disposed in an exhaust system of said engine for detecting the composition of exhaust gases emitted from said engine to detect the air-to-fuel ratio of the air-fuel mixture supplied to said engine and generate an air-to-fuel ratio signal;

f. engine speed sensing means for detecting the rotational speed of said engine to generate an engine speed signal;

g. an actuating circuit, connected to said air-to-fuel ratio sensing means and said driving motor, for actuating the driving motor in accordance with said air-to-fuel ratio signal from said air-to-fuel ratio sensing means;

h. percolation sensing means for detecting percolation of the fuel in said carburetor to generate a percolation signal; and i. an idling control circuit, connected to said actuating circuit, said engine speed sensing means and said percolation sensing means, for stopping the actuation of said driving motor by said actuating circuit when said engine is at an idling operation and percolation of the fuel is not occurring.

2. A system according to claim 1, wherein said percolation sensing means includes a cooling water temperature sensor for detecting the temperature of cooling water of said engine to indirectly detect percolation of said fuel.

3. A system according to claim 2, wherein said cooling water temperature sensor is preset at a temperature higher than 90° C and includes a switch operable in response to temperatures higher than said preset temperature.

4. A system according to claim 1, wherein said engine includes a catalytic converter disposed in the exhaust system thereof.

5. A system according to claim 4, wherein said catalytic converter is a three-component catalytic converter capable of efficiently reducing $NO_x$, HC and CO emissions when the air-fuel mixture supplied to said engine has a stoichiometric air-to-fuel ratio.

6. A system according to claim 1, further comprising fully closed position detecting means for detecting the position of said control valve and for stopping the actuation of said driving motor when said control valve comes near a fully closed position.

7. A system according to claim 6, wherein said fully closed position detecting means includes a switch operable in response to the movement of said control valve to near said fully closed position.

8. A method for adjusting an air-to-fuel ratio of an air-fuel mixture to be supplied to an internal combustion engine comprising the steps of:

applying an air-fuel mixture to an internal combustion engine through a main passage;

measuring the concentration of an oxygen component in the exhaust gases of said engine;

applying additional air to the air-fuel mixture through a bypass in accordance with the oxygen concentration in the exhaust gases;

detecting idling conditions of said engine;

detecting percolation phenomenon of a fuel to be supplied to said engine; and stopping the control of the amount of the additional air both when said engine is at the idling operation and when the percolation of the fuel is not taking place.

9. An air-to-fuel ratio adjusting system for an internal combustion engine comprising:

a carburetor coupled to an intake manifold of an internal combustion engine and including a main passage and a bypass passage for supplying air-fuel mixture to said engine, said carburetor also including a float chamber for storing fuel therein and a fuel nozzle opening to said main passage at one end and communicated with said float chamber at the other end;

a throttle valve pivotally disposed in said main passage for controlling the amount of air-fuel mixture through said main passage;

a control valve disposed in said bypass passage for varying the opening area of said bypass passage;

said bypass passage communicating with said main passage downstream of said throttle valve, whereby said control valve controls the amounts of additional air supplied to said main passage through said bypass passage;

driving means coupled to said control valve for driving the same;

air-to-fuel ratio sensing means disposed in an exhaust system of said engine for detecting the composition of exhaust gases emitted from said engine and generating an air-to-fuel ratio signal;

an actuating circuit, connected to said air-to-fuel ratio sensing means and said driving means, for actuating said driving means in accordance with said air-to-fuel ratio signal, engine speed detecting means for detecting the rotational speed of said engine;

percolation detecting means for detecting the percolation of the fuel in said float chamber; and an idling control circuit, connected to said actuating circuit, said engine speed detecting means and said percolation detecting means, for stopping the actuation of said driving means by said actuating circuit during a time:

1. when the rotational speed of said engine is below a predetermined value, and 2. when percolation of the fuel is not taking place.

10. An air-to-fuel ratio adjusting system according to claim 9, wherein said percolation detecting means comprises temperature detecting means for detecting the temperature of the fuel in said float chamber.

* * * * *